United States Patent
Heurguier et al.

(10) Patent No.: US 12,379,451 B2
(45) Date of Patent: Aug. 5, 2025

(54) METHOD FOR DETERMINING THE POSITION OF A DECOY USING AT LEAST ONE RECEIVER

(71) Applicants: THALES, Courbevoie (FR); INSTITUT MINES TELECOM, Palaiseau (FR)

(72) Inventors: Dominique Heurguier, Gennevilliers (FR); Nel Samama, Evry (FR); Alexandre Vervisch-Picois, Palaiseau (FR)

(73) Assignees: THALES, Courbevoie (FR); INSTITUT MINES TELECOM, Palaiseau (FR)

( * ) Notice: Subject to any disclaimer, the term of this patent is extended or adjusted under 35 U.S.C. 154(b) by 735 days.

(21) Appl. No.: 17/565,176

(22) Filed: Dec. 29, 2021

(65) Prior Publication Data
US 2022/0214459 A1   Jul. 7, 2022

(30) Foreign Application Priority Data
Dec. 30, 2020 (FR) ...................................... 2014241

(51) Int. Cl.
*G01S 5/02* (2010.01)
*G01S 5/06* (2006.01)
*G01S 19/21* (2010.01)

(52) U.S. Cl.
CPC .......... *G01S 5/0246* (2020.05); *G01S 5/0249* (2020.05); *G01S 5/06* (2013.01); *G01S 19/215* (2013.01)

(58) Field of Classification Search
CPC .... G01S 19/215; G01S 5/0246; G01S 5/0249; G01S 5/06
See application file for complete search history.

(56) References Cited

U.S. PATENT DOCUMENTS

| | | | | |
|---|---|---|---|---|
| 5,379,047 A | * | 1/1995 | Yokev | G01S 5/04 375/132 |
| 2011/0102259 A1 | * | 5/2011 | Ledvina | G01S 19/215 342/357.59 |
| 2019/0187294 A1 | * | 6/2019 | Khalajmehrabadi | G01S 19/215 |

FOREIGN PATENT DOCUMENTS

FR   2 992 069 A1   12/2013

OTHER PUBLICATIONS

P.S. Maybeck, Stochastic models, estimation, and control, vol. 1, Academic Press, p. 12-13 and 217 (Year: 1979).*

(Continued)

*Primary Examiner* — William Kelleher
*Assistant Examiner* — Fred H Mull
(74) *Attorney, Agent, or Firm* — BakerHostetler (57) ABSTRACT

A method for determining the position of a decoy using at least one receiver, the method includes a step for detecting a decoy attack, a step for correcting the clock bias delivered by the receiver based on an estimated drift ($D_j$) of the clock of the receiver. The method comprises a step for differential measurements using at least three corrected clock biases ($CB_{jcorr}(t")$, $CB_{kcorr}(t")$, $CB_{lcorr}(t")$) and a localization step for determining the position of the decoy.

16 Claims, 6 Drawing Sheets

(56) References Cited

OTHER PUBLICATIONS

M. Psiaki et al., Civilian GNSS Spoofing, Detection, and Recovery, in Position, Navigation, and Timing Technologies in the 21st Century: Integrated Satellite Navigation, Sensor Systems, and Civil Applications, vol. 1, First Edition. Edited by Y. T. Jade Morton et al., p. 655-680 (Year: 2020).*

NAVSTAR GPS Space Segment/Navigation User Segment Interfaces, IS-GPS-200, 228 pages (Year: 2020).*

Wiley Online Library, Entry for M. Psiaki et al., Civilian GNSS Spoofing, Detection, and Recovery, accessed from https://onlinelibrary.wiley.com/doi/10.1002/9781119458449.ch25 on Aug. 9, 2024 (Year: 2024).*

Bhamidipati, et al., "GPS Multireceiver Joint Direct Time Estimation and Spoofer Localization", IEEE Transactions on Aerospace and Electronic Systems, vol. 55, Issue: 4, pp. 1907-1919, Aug. 2019.

Shang, et al., "A Novel Method for GNSS Meaconer Localization Based on a Space-Time Double-Difference Model", IEEE Transactions on Aerospace and Electronic Systems, vol. 56, Issue: 5, pp. 3432-3449, Feb. 2020.

Truong, "Digue : Détection d'Interférences Gnss pour U.a.v autonomE", Theses, Institute Polytechnique de Paris, Dec. 8, 2020.

Dempster, et al., "Interference Localization for Satellite Navigation Systems", Proceedings of the IEEE, vol. 104, Issue: 6, pp. 1318-1326, Jun. 2016.

\* cited by examiner

METHOD FOR DETERMINING THE POSITION OF A DECOY USING AT LEAST ONE RECEIVER

CROSS-REFERENCE TO RELATED APPLICATIONS

This application claims priority to foreign French patent application No. FR 2014241, filed on Dec. 30, 2020, the disclosure of which is incorporated by reference in its entirety.

FIELD OF THE INVENTION

The present invention relates to the field of satellite radionavigation systems, also known under the name of GNSS systems (for Global Navigation Satellite System). Known examples are the American system GPS (for Global Positioning System) and the European system GALILEO.

BACKGROUND

In order to carry out a calculation of position using GNSS signals, a receiver must implement a certain number of complex processing operations. The term "receiver" is understood to mean an apparatus that receives and processes signals transmitted by waves. These receivers are, for example, used in motor vehicles such as a GPS receiver for assisting the driver or for managing the entire movement of the vehicle in the case of an autonomous motor vehicle.

Thus, an erroneous processing of the received signal or the receipt of a malicious signal may have severe consequences for the safety of the driver of the vehicle or of the pedestrian. However, in the field of satellite radionavigation systems, an attack by decoy is possible. The aim of such an attack by decoy is to replace the reference radionavigation system by another dummy system controlled by the malicious person. Thus, from the point of view of the receiver, the dummy system will have the same degree of trust as the reference system. Accordingly, it suffices for the malicious person to transmit signals representative of those emitted by the reference system but containing erroneous data aimed at corrupting the whole chain for processing the signal, for example by falsifying the PVT (for Position, Velocity and Time) information delivered by the receiver. Various types of decoy attacks are possible. Thus, in a first type of decoy attack, coherent decoys are used. These decoys are notably capable of duping a potential autonomous device for monitoring the integrity of the receiver or RAIM (for Receiver Autonomous Integrity Monitoring), for example, by scrambling the target prior to launching false signals or by generating low-power false signals then subsequently by increasing the power until they are slightly higher power than the real signals. A second type of decoy attack is based on an attack by repetition, for example, by recording and repeating the real signals (attack by "meaconing"). A third type of decoy attack is an advanced attack, for example, by the generation of decoy signals and cancelling signals (attack by "nulling") or by sending signals coming from several directions (multi-antenna attack).

The document FR2992069 discloses a solution for countering decoy attacks by using signals secured notably by cryptography. Complementary processing operations are then needed. These processing operations are done remotely in reference stations offering enhanced protection capacities for processing and for correction of the measurements. However, these processing operations increase the overall complexity and the cost of the receivers. Furthermore, the solution disclosed in this document does not allow the position of the decoy to be detected in order to effectively handle an attack from its source.

There is accordingly a need to improve the determination of the position of a decoy in order to eliminate any risk of an additional attack in a simple and practical manner.

SUMMARY OF THE INVENTION

The present invention aims to meet this need, at least in part.

More particularly, the present invention aims to improve the determination of the position of a decoy in the field of satellite radionavigation systems.

A first subject of the invention relates to a method for determining the position of a decoy using at least one receiver, the said receiver being designed to receive signals coming from satellites of a GNSS radionavigation system. The receiver and the GNSS radionavigation system each have a clock respectively referred to as clock of the receiver and reference clock, the said clock of the receiver and the said reference clock having a time difference at a time t referred to as reference clock bias. The clock of the receiver drifts over time with respect to the reference clock. The method comprises a step for detecting a decoy attack, a step for correcting the clock bias delivered by the receiver at a time t", referred to as corrected clock bias, the said correction being made based on an estimated drift of the clock of the receiver. The method comprises a step for differential measurements using at least three corrected clock biases to determine the position of the decoy.

Thus, the invention provides a technique for localizing a GNSS decoy using only information coming from signals received by one or more receivers. This technique is based on the estimation of a time difference, referred to as clock bias, between a clock of the receiver and a clock of the emitter, whether this emitter is an authentic satellite of a GNSS radionavigation system or a decoy. The clock of a receiver or the clock of a satellite is an internal device allowing a time reference to be obtained. For a satellite, the clock used is, for example, an atomic clock. An atomic clock uses the durability and the immutability of the frequency of the electromagnetic radiation emitted by an electron when going from one energy level to another in order to ensure the exactitude and the stability of the oscillating signal that it produces. This atomic clock exhibits a very high reliability. Moreover, the clocks of the various satellites are synchronized so as to share a time reference common to the constellation of satellites forming the GNSS radionavigation system. For a receiver, the clock used is a clock with a lower precision. Moreover, the stability of this clock in the receiver is much less than the stability of the atomic clocks used in the satellites. Indeed, the clock of the receiver is subject to a phenomenon of significant drift over time. In the framework of an authentic radionavigation system, the size of this phenomenon of relative drift of the clock of the receiver may be determined using the signals coming from the satellites. The invention provides an estimate of a relative drift of the clock of the receiver with respect to the clock of the decoy (during the decoying phase) or with respect to the reference clock of the GNSS radionavigation system (during the phase prior to decoying) based on received signals coming from the decoy or from the radionavigation system. It is then possible to predict, at a time t", the relative drift of the clock either with respect to the decoy or with respect to the reference system and to deduce from this a corrected clock bias between the said receiver and the said decoy. Using at least three corrected clock biases, a position of the decoy is determined by differential measurements. The corrected clock biases come from at least three successive measurements carried out by the same receiver. In another embodiment, the corrected clock biases come from at least three receivers on board various platforms designed to exchange data with one another.

In one particular embodiment, the position of the decoy is obtained using only one receiver, the said receiver being mobile, and the estimated drift is determined with respect to a clock of the decoy.

The bias (decoy/receiver) is modelled once the decoy is active.

In one particular embodiment, the corrected clock bias corresponds to the equation:

$$CB_{corr}(t'')=(\delta_s(t'')-\delta(t''))-D(t''-t_0)-CBe(t_0),$$

in which $\delta_S$ represents a value of the drift of the clock of the decoy, $\delta$ is the actual drift of the clock of the receiver, D is the estimated drift of the receiver clock with respect to the clock of the decoy at any given time $t''>t_0$, $CBe(t_0)$ is the known value of the clock bias delivered by the receiver at the time to of the start of an attack.

The bias (decoy/receiver) is modelled in the following manner: $CBe(t'')=D \cdot (t''-t_0)+CBe(t_0)$ in which $CBe(t'')$ is the bias $\delta_{ts}(t'')-\delta(t'')$ (receiver/decoy) estimated at the time t', $CBe(t_0)$ is the known value of the bias at $t_0$, D is the estimated drift of the clock receiver with respect to the clock of the decoy at any given time $t''>t_0$, $\delta$ is the actual drift of the clock of the receiver, $\delta_{ts}$ represents a value of the actual drift of the clock of the decoy.

The following relationship will also be noted:

$$CB_{corr}(t'')\approx(\delta_s(t'')-\delta(t''))-(\delta_{ts}(t'')-\delta(t'')).$$

In one particular embodiment, the position of the decoy is determined using several receivers and the estimated drift is determined with respect to the GNSS radionavigation system.

The bias (GNSS constellation/receiver) is modelled using data obtained before the decoy is active.

In one particular embodiment, the corrected clock bias corresponds to the equation:

$$CB_{jcorr}(t'')=(\delta_s(t'')-\delta_j(t''))-D_j(t''-t_0)-CBe_j(t_0)$$

in which $\delta_S$ represents a value of the drift of the clock of the decoy as seen by the receiver, $\delta_j$ is the actual drift of the clock of the $j^{th}$ receiver, $D_j$ is the estimated drift of the clock of the receiver j with respect to the GNSS constellation at any given time $t''>t_0$, $CBe_j(t_0)$ is the known value of the clock bias delivered by the $j^{th}$ receiver at the time $t_0$ of the start of an attack.

The following relationship will also be noted:

$$CB_{jcorr}(t'')\approx(\delta_s(t'')-\delta_j(t''))-(\delta t_{GNSS}(t'')-\delta_j(t''))$$

in which $\delta t_{GNSS}$ represents the actual drift of the clock of the constellation.

The bias ($j^{th}$ receiver/GNSS constellation) is modelled in the following manner: $CBe_j(t'')=D_j \cdot (t''-t_0)+CBe_j(t_0)$. $CBe_j(t'')$ is the bias $\delta t_{GNSS}(t'')-\delta_j(t'')$ (receiver j/GNSS constellation) estimated at the time t', $CBe_j(t_0)$ is a known value of the bias at $t_0$, $D_j$ is the estimated drift of the clock of the receiver j with respect to the GNSS constellation at any given time $t''>t_0$, $\delta t_{GNSS}$ represents the actual drift of the clock of the constellation, $\delta_j$ represents the actual drift of the clock of the $j^{th}$ receiver.

In one particular embodiment, the localization of the decoy is carried out using a multilateration method, the said multilateration method being designed to process a time difference of signals, such as a TDOA method.

The TDOA (for Time Difference Of Arrival) method of localization consists in calculating the difference between times of arrival of a signal at several measurement points and in calculating the source point on the basis of these differential delays. It is a simple and practical method which allows the position of the decoy to be determined in an efficient manner.

In one particular embodiment involving mobile platforms, the method comprises a step for exploiting Doppler measurements to improve the determination of the position of the decoy.

In one particular embodiment, the receiver is mobile and the position of the decoy is estimated based on measurements carried out at various times.

In one particular embodiment, the position of the decoy is estimated by several receivers based on measurements carried out at the same time.

It will be noted that the receivers may be fixed or mobile.

The step for detecting the decoy attack comprises a step for receiving an input signal by the at least one receiver at a time t', the said input signal comprising information on a clock of the emitter of the said input signal. The step for detecting the attack comprises a step for determining a time difference between the clock of the receiver and the clock of the emitter of the said input signal at this time t', referred to as determined clock bias.

It will be noted that the step for determining the time difference is obtained by an estimation of the relative drift. This determination step takes place at any time. The detection of the decoy attack relies, for example, on the detection of a jump of a clock bias at a the time t' and it corresponds to the time $t_0$ of the start of an attack.

As soon as it is determined that the emitter is a decoy, the receiver is oriented towards another satellite radionavigation system and/or the mobility of the receiver is managed by an assembly of mechanical sensors.

Another subject of the invention relates to a device for determining the position of a decoy using at least one receiver, the said receiver being designed to receive signals coming from satellites of a GNSS radionavigation system, the said receiver and the said GNSS radionavigation system each having a clock respectively referred to as clock of the receiver and reference clock. The clock of the receiver and the reference clock exhibit a time difference at a time t referred to as reference clock bias. The clock of the receiver drifts over time with respect to the reference clock. The determination device comprises a module for detecting a decoy attack and a block for correcting the clock bias delivered by the receiver referred to as corrected clock bias, the said correction being made based on an estimated drift of the clock of the receiver. The correction block is designed to determine at least three corrected clock biases. The determination device also comprises a block for differential measurements using corrected clock biases in order to determine the position of the decoy.

This determination device is designed to be placed in the receiver or in a navigation system exploiting the information delivered by the receiver.

Another subject of the invention relates to a navigation system designed to exploit the information delivered by at least one receiver, the said navigation system comprising a device for determining the position of a decoy according to one of the preceding subjects.

The navigation system is, for example, carried on board an autonomous motor vehicle comprising a GPS receiver for assisting the driver or for managing the entire movement of this vehicle.

Another subject of the invention relates to an aircraft comprising a device for determining the position of a decoy according to one of the preceding subjects.

In one particular embodiment, the aircraft is a drone.

In one particular embodiment, the drone is a master drone designed to communicate with a plurality of other drones called slave drones.

The drones carrying the onboard receivers collaborate and they have at their disposal a communications network allowing the exchange of information.

Another subject of the invention relates to a computer program product comprising program instructions usable by the device for determining the position of a decoy according to one of the preceding subjects which, when they are executed or interpreted by the said determination device, trigger the implementation of the method for determining the position of a decoy according to one of the preceding subjects.

BRIEF DESCRIPTION OF THE DRAWINGS

The present invention will be better understood upon reading the detailed description of embodiments taken by way of non-limiting examples and illustrated by the appended drawings in which.

In the various figures, identical or similar elements carry the same references.

DETAILED DESCRIPTION

Figure 1:
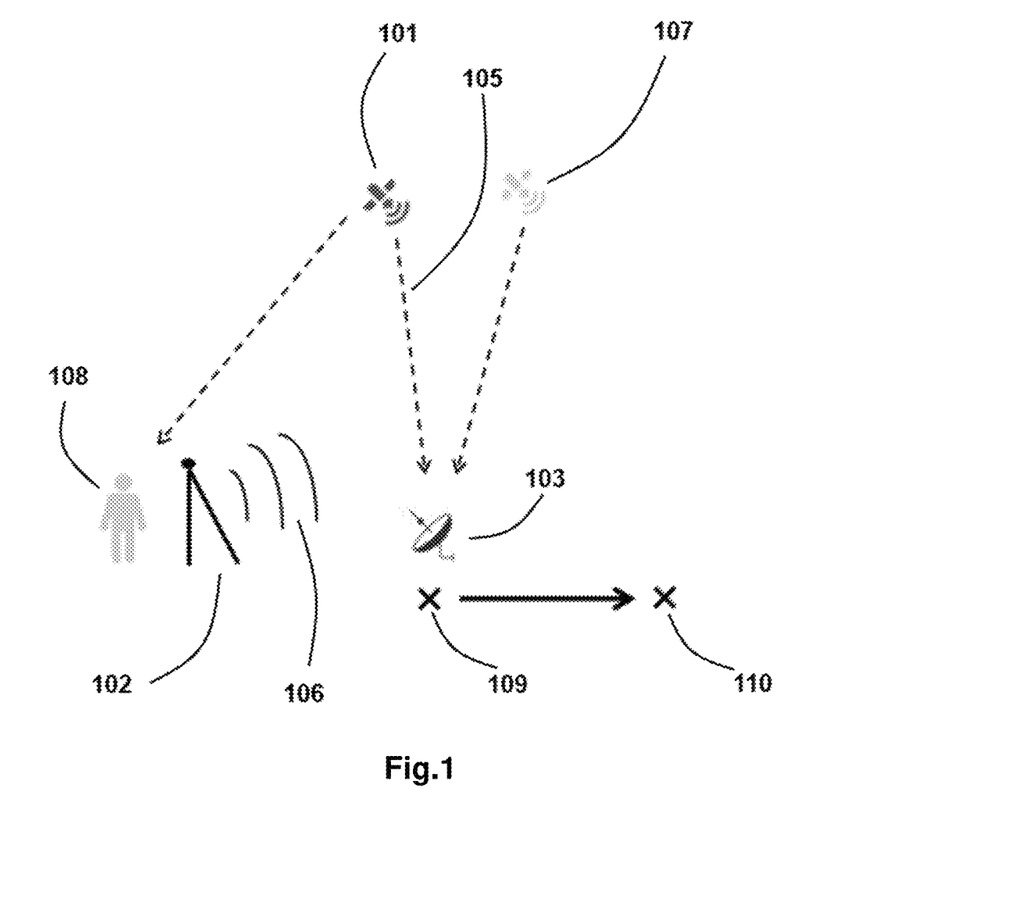
FIG. 1 is a view illustrating a decoy attack targeting a receiver.

FIG. 1 illustrates an attack by a decoy 102 aimed at a receiver 103. Here, the receiver is placed in a mobile vehicle. The receiver 103 is designed to receive an authentic signal 105 coming from a satellite 101 of a satellite radio-navigation system. Preferably, the motor vehicle is an autonomous motor vehicle. As a variant, the receiver 103 belongs to an aircraft, for example to a drone. The authentic signal 105 allows the receiver 103 to know the real localization 109 of the vehicle or of the aircraft carrying the said receiver 103.

During the attack, a malicious person 108 tries to replace the authentic signal 105 with a malicious input signal 106 at the receiver 103. In one type of attack, the malicious signal 106 has a higher power than the authentic signal 105 at the receiver 103. Accordingly, the authentic signal 105 is "smothered" by the malicious signal 106 and the receiver 103 only now "hears" this malicious signal 106. The malicious signal 106 can then transmit erroneous information in order for the receiver to determine a dummy localization 110 shifted with respect to the real localization 109.

Figure 2:
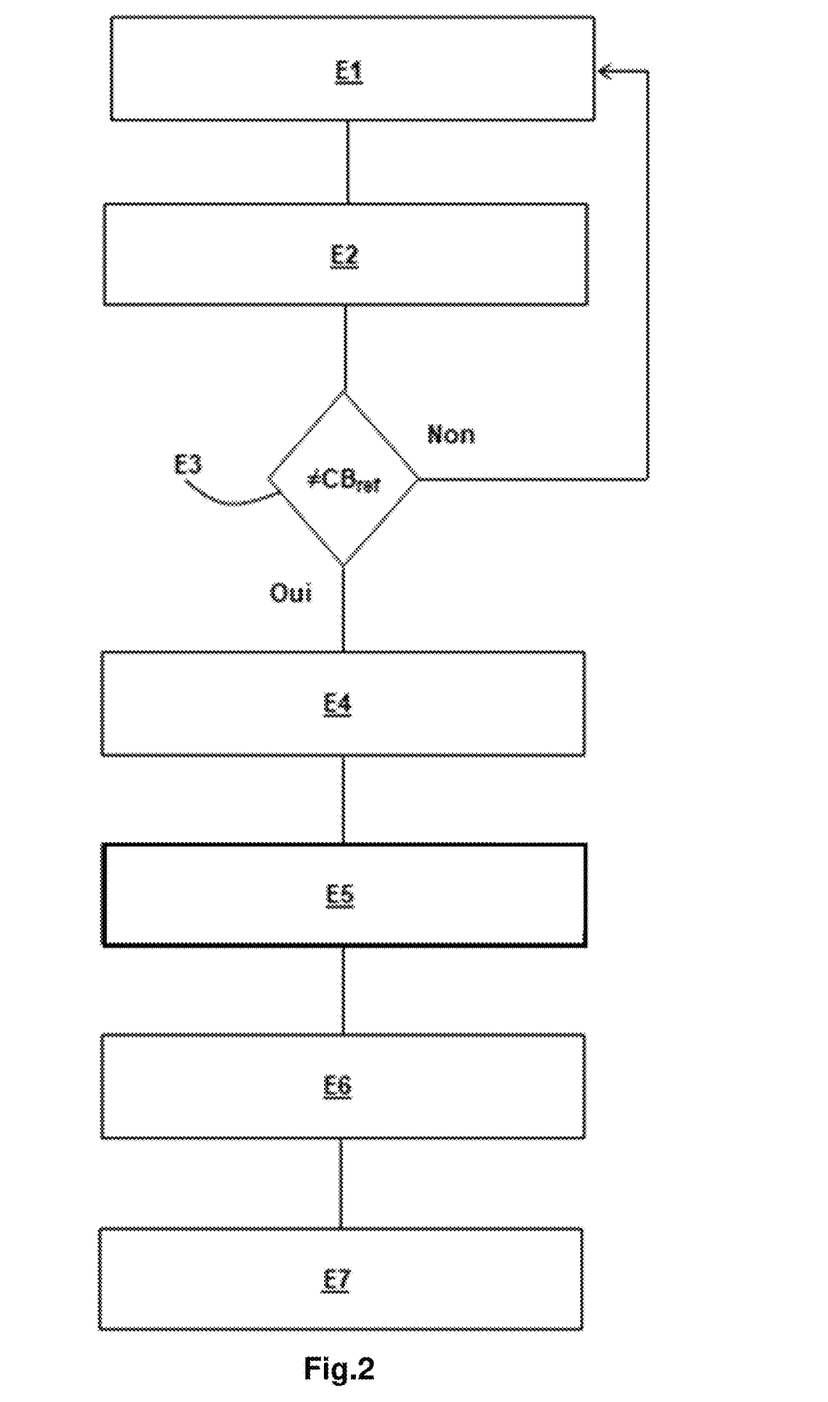
FIG. 2 is a diagram illustrating the various steps of a method for determining the position of the decoy using the receiver in FIG. 1, according to a first embodiment of the invention.

FIG. 2 illustrates the various steps of a method for determining the position of the decoy 102 using the receiver 103, according to a first embodiment of the invention.

As has already been stated, the receiver 103 is designed to receive signals coming from a constellation of satellites 101 of a reference GNSS radionavigation system. This receiver 103 and this constellation of satellites 101 each possess an internal clock. In the case of the constellation of satellites, the internal clock of this constellation is also called reference clock. The clock of the receiver 103 and the reference clock of the constellation of satellites 101 exhibit a time difference, referred to as reference clock bias ($CB_{ref}(t)$) determined at a time t.

Furthermore, for reasons of production costs, the clock of the receiver has, in general, a much lower performance specification than the reference clock of the constellation of satellites. This clock of the receiver is thus subject to relatively large drifts over time with respect to the reference clock of the constellation of satellites.

The method for determining the position of the decoy 102 is illustrated in the following using FIG. 2.

For this first embodiment of the invention, the assumptions are as follows:
- the decoy 102 is a single-point coherent decoy. It represents a false constellation co-localized at a fixed position S on the ground;
- the vehicle carrying the receiver is mobile and P(t) is the position of the vehicle at a time t;
- the drift of the clock of the receiver 103 with respect to the clock of the constellation of satellites 101 is known or estimated and hence predictable in the short term;
- the reference clock bias $CB_{ref}(t)$, delivered by the receiver prior to the decoy attack, at a time t, between the clock of the receiver 103 and the clock of the constellation of satellites 101 is expressed in the following manner:

$$CB_{ref}(t) = (\delta t_{GNSS}(t) - \delta(t))$$

in which $\delta t_{GNSS}(t)$ represents the actual drift of the clock of the constellation of satellites 101 calculated at a time t and $\delta(t)$ represents a value of the actual drift of the clock of the receiver 103 at the said time t. The reference clock bias $CB_{ref}(t)$ is therefore determined at this time t. It is delivered by the receiver 103 following the calculation of the PVT information. The reference clock bias corresponds to a relative drift which is accessible, in contrast to the absolute drift values.

It will be noted that, if the drift of the clock of the receiver 103 with respect to the clock of the constellation of satellites 101 is known or estimated, it is possible to predict, at any time t'>t, the reference value $CB_{ref}(t')$, where $CB_{ref}(t') = CB_{ref}(t) + \Delta_{tt'}$, with $\Delta_{tt'}$ a variation of the clock bias between t and t'. This variation of the clock bias is linked to the relative drift of the clock 103 with respect to the clock of the constellation of satellites 101.

At this time t', the receiver 103 receives an input signal in a reception step E1. This input signal comprises information on the clock of the emitter of this input signal.

In a step E2, the receiver carries out a determination of a time difference between the clock of the receiver and the clock of the emitter of the input signal at this time t'. This time difference, delivered by the receiver following the PVT calculation, is called determined clock bias $CB_{det}(t')$.

Two cases are then possible:

First case: the input signal is a signal 105 coming from the satellite 101 and there is therefore no decoy attack. The determined clock bias $CB_{det}(t')$ corresponds to the reference clock bias at the time t': $CB_{ref}(t')$.

Second case: the input signal is a signal 106 coming from the decoy 102. The clock bias determined at this time t' is expressed in the following manner:

$$CB_{det}(t')=(\delta_s(t')-\delta(t'))$$

in which $\delta_s(t')$ represents a value of the drift of the clock of the decoy 102 at a time t' and $\delta(t')$ represents a value of the actual drift of the clock of the receiver 103 at the said time t'.

In this second case, $CB_{det}(t')$ is different from $CB_{ref}(t')$ (which characterizes a decoy attack). It will be noted that, in the following, the time t' is called time $t_0$ of the start of the decoy attack.

For any time t" since the time $t_0$ of the start of the decoy attack, the clock bias delivered by the receiver 103, after the calculation of the PVT information, is expressed as:

$$CB(t'')=(\delta_s(t'')-\delta(t''))$$

In the case of a single-point coherent decoy, the term $\delta_s(t'')$ is the sum of a component linked to an actual drift $\delta t_s(t'')$ and of a component linked to the decoy/receiver travel time $(d(S, P(t''))/c$, according to the equation:

$$\delta_s(t'') = \frac{d(S, P(t''))}{c} + \delta_s(t'')$$

in which c corresponds to the speed of light.

In a step E4, the receiver 103 estimates, at each time t" since the detection of the decoy attack $t_0$, an estimated bias $\delta t_s(t'')-\delta(t'')$ of its clock with respect to the clock of the decoy 102. This bias is estimated according to the equation:

$$\delta t_s(t'')-\delta(t'')\sim D \cdot t''+(\delta t_s(t_0)-\delta(t_0))$$

in which, D corresponds to an estimated drift of the clock of the receiver with respect to the clock of the decoy 102. This estimated drift is known notably if the actual drift of the clock of the receiver with respect to the constellation of satellites 101 is estimated prior to the detection of the attack and the drift of the clock of the decoy (representing a false constellation) with respect to the true constellation is negligible. This is notably the case when the clock of the decoy 102 is closed-loop controlled to the clock of the constellation of satellites 101 or is estimated based on the observation of the clock bias delivered by the receiver.

In a step E5, the method determines a corrected clock bias $CB_{corr}(t'')$ by subtracting from the clock bias delivered by the receiver 103 the bias $\delta t_s(t'')-\delta(t'')$ estimated at the step E4. This corrected clock bias corresponds to the equation:

$$CB_{corr}(t'')=(\delta_s(t'')-\delta(t''))-(\delta t_s(t'')-\delta(t''))$$

In a step E6, a position of the decoy 102 is determined. For this purpose, the receiver 103 differentiates the corrected clock bias at the time t" with the corrected clock bias at the time $t_0$, which gives a TDOA measurement between the position of the decoy 102 and the position of the vehicle at the time $t_0$ and at the time t" according to the equations:

$$CB_{corr}(t'') - CB_{corr}(t0) = (\delta_S(t) - \delta ts(t)) - (\delta_S(t0) - \delta ts(t0))$$

$$CB_{corr}(t'') - CB_{corr}(t0) = \frac{d(S, P(t''))}{c} - \frac{d(S, P(t0))}{c}$$

$$CB_{corr}(t'') - CB_{corr}(t0) = TDOA_{t,t0}$$

These differential measurements, of the TDOA type, performed at several moments in time, allow the 2D or 3D localization of the decoy by any given multilateration method. Localization by TDOA multilateration is a localization technique based on the measurement of the times of arrival of waves with a known speed of propagation.

Figure 3:
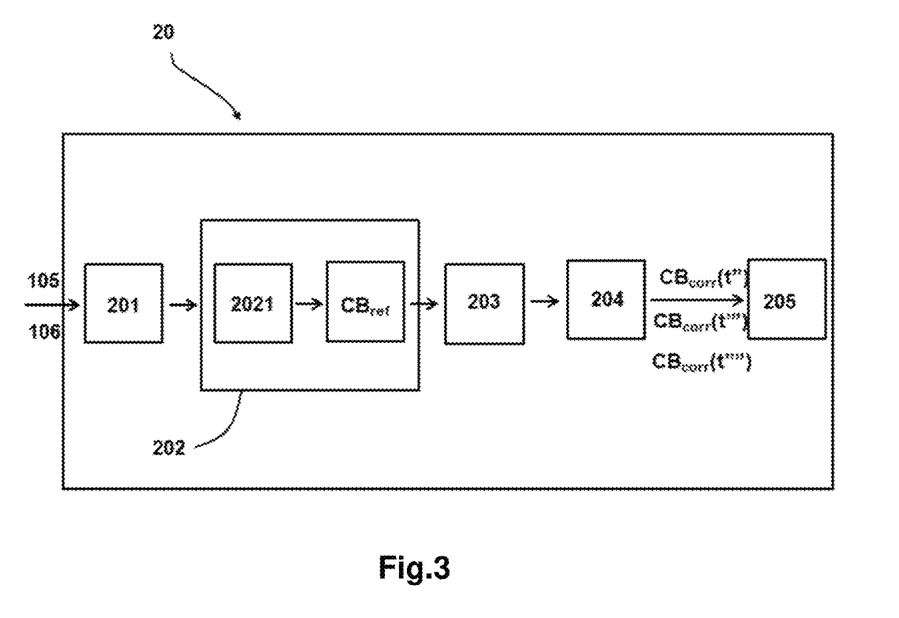
FIG. 3 is a diagram illustrating a device for determining the position of a decoy for an implementation of the method in FIG. 2.

FIG. 3 illustrates a device 20 for determining the position of the decoy 102, this device being designed to be placed either in the receiver 103 or in the navigation system of the platform using the PVT data delivered by the receiver 103. The determination device 20 comprises an antenna 201 designed to receive a signal 105 coming from the constellation of satellites 101 or a signal 106 coming from the decoy 102. The determination device 20 also comprises a module 202 for determining an attack by the decoy 102. More particularly, this determination module 202 comprises a block 2021 for determining a time difference between the clock of the receiver 103 and the clock of the emitter (satellite 101 or decoy 102) at a time t' referred to as determined clock bias $CB_{det}(t')$ and, if the determined clock bias is different from the reference clock bias $CB_{ref}(t')$, then the emitter is a decoy 102. The time t' corresponds to the time to of the start of the attack. The determination device 20 also comprises a block 203 for estimating the drift D of the clock of the receiver using data of the input signal 106 coming from the decoy 102 at a time t". This input signal 106 comprises information on the clock of the decoy 102. The determination device 20 comprises, furthermore, a block 204 for determining the clock bias between the receiver 103 and the decoy 102, referred to as corrected clock bias $CB_{corr}(t'')$. This corrected clock bias is determined from the estimated bias $\delta t_s(t'')-\delta(t'')$ of the clock of the receiver 103. It will be noted that the determination block 204 is capable of determining other corrected clock biases, for example a corrected clock bias $CB_{corr}(t''')$ at a time t''' or a corrected clock bias $CB_{corr}(t'''')$ at a time t'''' with t''''>t'''>t".

Finally, the determination device 20 comprises a block for differential measurements and for localization 205 using the three corrected clock biases $CB_{corr}(t'')$, $CB_{corr}(t''')$, $CB_{corr}(t'''')$ to determine the position of the decoy 102.

Figure 4:
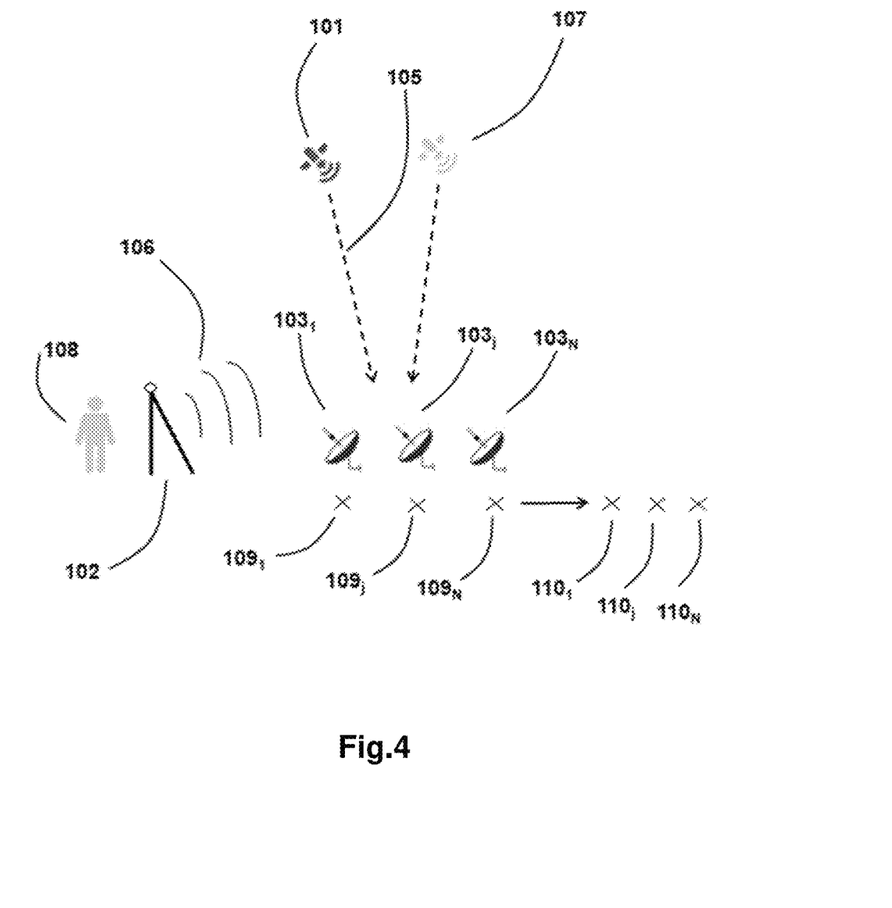
FIG. 4 is a view illustrating a decoy attack targeting a plurality of receivers.
Figure 5:
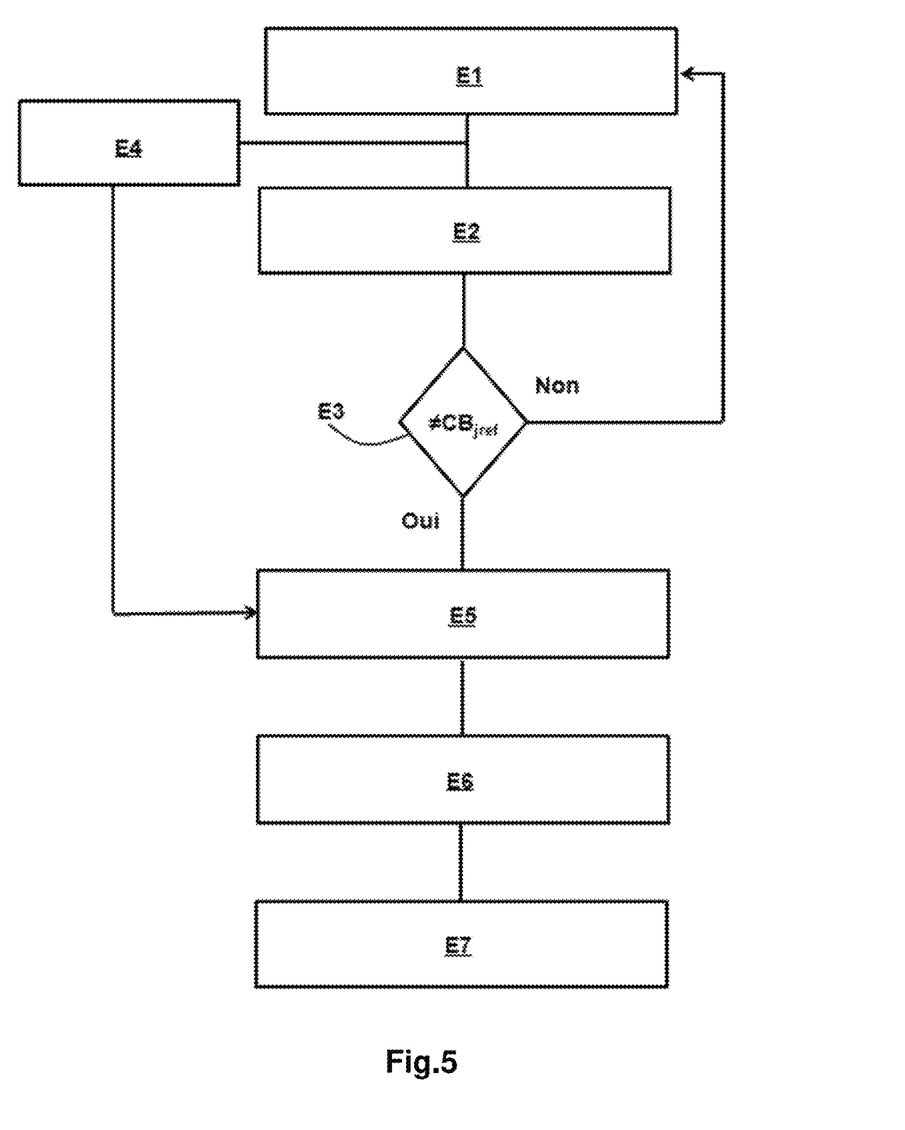
FIG. 5 is a diagram illustrating the various steps of a method for determining the position of a decoy using the receivers in FIG. 4, according to a second embodiment of the invention.
Figure 6:
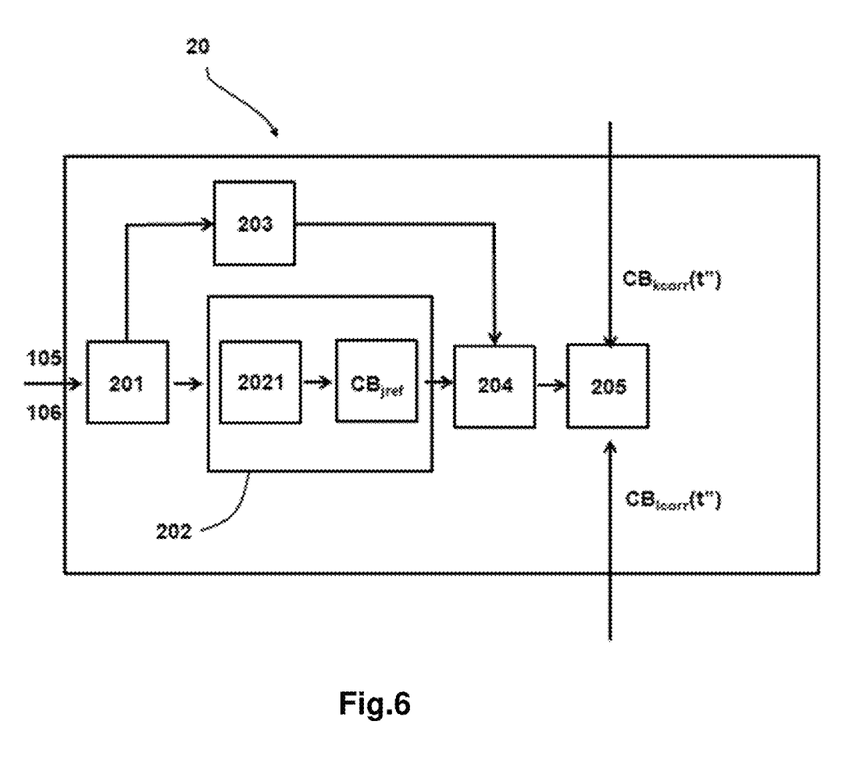
FIG. 6 is a diagram illustrating a device for determining the position of a decoy for an implementation of the method in FIG. 5.

FIGS. 4, 5 and 6 illustrate a second embodiment of the invention. In this second embodiment, the signals from the constellation of satellites 101 are received by a plurality of receivers $103_1, \ldots 103_j, \ldots 103_N$.

FIG. 4 illustrates an attack by a decoy 102 aimed at a plurality of receivers $103_1, \ldots 103_j, \ldots 103_N$. The receivers are for example placed in a swarm of drones designed to communicate with one another. Each receiver $103_1, \ldots 103_j, \ldots 103_N$ is designed to receive an authentic signal 105 coming from a satellite 101 of a satellite radionavigation system. The authentic signal 105 allows the receivers $103_1, \ldots 103_j, \ldots 103_N$ to know the real localizations $109_1, \ldots 109_j, \ldots 109_N$ of the drones transporting them.

During the attack, a malicious person 108 tries to replace the authentic signal 105 with a malicious input signal 106 at the receivers $103_1, \ldots, 103_j, \ldots 103_N$. In one type of attack, the malicious signal 106 has a power higher than the authentic signal 105 at the receivers $103_1, \ldots 103_j, \ldots 103_N$.

Accordingly, the authentic signal 105 is "smothered" by the malicious signal 106 and the receivers 103₁, ... 103ⱼ, ... 103_N only now "hear" this malicious signal 106. The malicious signal 106 can then transmit erroneous information in order for the receivers 103₁, ... 103ⱼ, ... 103_N to determine dummy localizations 110₁, ..., 110ⱼ, ... 110_N shifted with respect to the real localizations 109₁, ..., 109ⱼ, ... 109_N.

FIG. 5 illustrates the various steps of a method for determining the position of the decoy 102 using a $j^{th}$ receiver 103ⱼ of the assembly of receivers 103₁, ... 103ⱼ, ... 103_N.

As has already been stated, the receiver 103*j* is designed to receive signals coming from a constellation of satellites 101 of a reference GNSS radionavigation system. This receiver 103*j* and this constellation of satellites 101 each possess an internal clock. In the case of the constellation of satellites 101, the internal clock of this constellation is also called reference clock. The clock of the receiver 103ⱼ and the reference clock of the constellation of satellites 101 exhibit a time difference, referred to as reference clock bias ($CB_{jref}$ (t)) determined at a time t.

Furthermore, for reasons of production costs, the clock of the receiver has, in general, a much lower performance specification than the reference clock of the constellation of satellites. This clock of the receiver is thus subject to relatively large drifts over time with respect to the reference clock of the constellation of satellites 101.

For this second embodiment, the assumptions are as follows:
- the decoy 102 is a single-point coherent decoy: it represents a false constellation co-localized at a fixed position S on the ground;
- there exist several receivers j, each receiver being carried by a mobile drone and $P_j(t)$ is the position of the $j^{th}$ receiver 103ⱼ at a time t;
- the drifts $D_j$ of the clock of the $j^{th}$ receiver 103ⱼ with respect to the clock of the constellation of satellites 101 is known or estimated prior to the decoy attack and predictable in the short term;
- the reference clock bias $CB_{jref}(t)$ between the clock of the $j^{th}$ receiver 103ⱼ and the clock of the constellation of satellites 101, delivered by the receiver at a time t, is expressed in the following manner:

$$CB_{jref}(t) = (\delta t_{GNSS}(t) - \delta_j(t))$$

in which $\delta t_{GNSS}(t)$ represents the actual drift of the clock of the constellation of satellites 101 at a time t and $\delta_j(t)$ is the actual drift of the clock of the $j^{th}$ receiver 103ⱼ at the said time t. The reference clock bias $CB_{jref}$ is therefore determined at this time t. It is delivered by the $j^{th}$ receiver 103ⱼ following the calculation of the PVT information.

It will be noted that, at any time t'>t, it is possible to determine a reference value $CB_{jref}(t')$ such that $CB_{jref}(t') = CB_{jref}(t) + \Delta_{tt'} = D_j \cdot (t'-t)$, with $\Delta_{tt'}$ a variation of the clock bias between t and t'. This variation of the clock bias is linked to the drift of the clock of the receiver 103*j* with respect to the clock of the satellite 101. As has already been stated, this drift is known or estimated and hence predictable in the short term. It will also be noted that the drift $D_j$ of the clock of the receiver 103 with respect to the clock of the constellation is estimated using the clock biases delivered by the receiver in a step E4 which precedes the decoy attack. This allows the relative drift of the receiver at each time t" to be predicted according to the equation:

$$\delta_s(t'') - \delta(t'') = D_j(t''-t_0) + (\delta_s(t_0) - \delta j(t_0))$$

where $t_0$ corresponds to the time of the decoy attack 102.

At a time t'>t, the receiver 103*j* receives an input signal in a reception step E1. This input signal comprises information on the clock of the emitter of this input signal.

In a step E2, the receiver carries out a determination of a time difference between the clock of the receiver and the clock of the emitter of the input signal at this time t'. This time difference is called determined clock bias $CB_{jdet}(t')$.

Two cases are then possible:

First case: the input signal is a signal 105 coming from the satellite 101. The determined clock bias $CB_{jdet}(t')$ corresponds to the reference clock bias at the time t', $CB_{jref}(t')$, and there is no decoy attack.

Second case: the input signal is a signal 106 coming from the decoy 102. The clock bias delivered by the receiver, at this time t', is expressed as:

$$CB_{jdet}(t') = (\delta_s(t') - \delta_j(t'))$$

in which $\delta_s(t')$ represents a value of the clock of the decoy 102 as seen by the receiver at a time t' and $\delta_j(t')$ represents a value of the actual drift of the clock of the $j^{th}$ receiver 103 at the said time t'.

In this second case, $CB_{jdet}(t')$ is therefore different from $CB_{jref}(t')$ which characterizes a decoy attack. It will be noted that, in the following, the time t' corresponds to a time $t_0$ of the start of the decoy attack.

For any time t" since the time $t_0$ of the start of the decoy attack, it is possible to use the clock bias delivered by the receiver 103 with respect to the decoy 102 which is expressed as:

$$CB_j(t'') = (\delta_s(t'') - \delta_j(t''))$$

In the case of a single-point coherent decoy, the term $\delta_s(t'')$ is the sum of a component linked to an actual drift $\delta t_s(t'')$ and of a component linked to the decoy/receiver travel time $(d(S, P_j(t''))/c$, according to the equation:

$$\delta_S(t'') = \frac{d(S, P_j(t''))}{c} + \delta t_s(t'')$$

in which c corresponds to the speed of light.

In a step E5, the method determines a corrected clock bias $CB_{jcorr}(t'')$ by subtracting from the clock bias $CB_j(t'')$, delivered by the receiver 103, the difference $(\delta t_{GNSS}(t'') - \delta_j(t))$ calculated using the drift $D_j$ estimated at the step E4. This corrected clock bias corresponds to the following equations:

$$CB_{jcorr}(t'') = CB_j(t'') - D_j(t''-t0) - (\delta t_{GNSS}(t0) - \delta_j(t0))$$

$$CB_{jcorr}(t'') \approx (\delta_S(t'') - \delta_j(t'')) - (\delta t_{GNSS}(t'') - \delta_j(t''))$$

with $$(\delta_S(t'') - \delta_j(t'')) - (\delta t_{GNSS}(t'') - \delta_j(t'')) =$$

$$\frac{d(S, P_j(t''))}{c} + \delta t_s(t'') - \delta t_{GNSS}(t'')$$

In a step E6, each drone transmits the corrected clock bias via the radiocommunications network either to the other drones (in a decentralized architecture) or to a master drone (in a centralized architecture). The master drone or each drone of the swarm calculates TDOA measurements by differentiating the preceding quantities between receivers, for example, between a receiver j1 and a receiver ji according to the following equations:

$$CB_{j1corr}(t'') - CB_{jicorr}(t'') = \frac{d(S, P_{j1}(t''))}{c} - \frac{d(S, P_{ji}(t''))}{c} = TDOA_{j1,ji}$$

These differential measurements of the TDOA type allow, with the caveat that at least three drones are decoyed and transmit the corrected clock biases, the 2D or 3D localization of the decoy by any given multilateration method.

For the first embodiment and for the second embodiment, if the platforms are mobile and are moving sufficiently quickly, it is possible to improve the determination of the position of the decoy 102 during a step E7 for exploiting Doppler measurements. These Doppler measurements are delivered by the receiver 103; 103$_j$ either directly or deduced from the radial velocities according to the equation:

$$FOA_{t''} = Fe + \frac{Vr_{t''}}{c} Fe$$

in which Fe is the frequency of the signal received and $Vr_{t''}$ the radial velocity at the time t''.

Since the decoy is assumed to be fixed, here, the Doppler results only from the motion of the vehicle (first embodiment) or from the drone (second embodiment).

If the vehicle is following a uniform rectilinear path, it is then possible to apply a localization of the FDS (for Frequency Doppler Shift) type, by potentially carrying out a manoeuvre to lift the left-right ambiguity.

FIG. 3 illustrates a device 20 for determining the position of the decoy 102, this device being designed to be placed either in the receiver 103 or in the navigation system of the platform exploiting the PVT data delivered by the receiver. The determination device 20 comprises an antenna 201 designed to receive a signal 105 coming from the constellation of satellites 101 or a signal 106 coming from the decoy 102. The determination device 20 also comprises a module 202 for determining an attack by the decoy 102. More particularly, this determination module 202 comprises a block 2021 for determining a time difference between the clock of the receiver 103 and the clock of the emitter (satellite 101 or decoy 102) at a time t' referred to as determined clock bias $CB_{jdet}(t')$, and if the determined clock bias is different from the reference clock bias $CB_{jref}(t')$ then the emitter is a decoy 102. The time t' corresponds to the time $t_0$ of the start of the attack. The determination device 20 also comprises a block 203 for estimating the drift $D_j$ of the clock of a receiver j using data of the input signal 105 coming from the constellation of satellites 101 at a time t''. This input signal 105 comprises information on the clock of the constellation of satellites 101. The estimation block 203 is disposed in parallel with the determination module 202. This block 203 is supplied by the antenna 201. The determination device 20 comprises, furthermore, a block 204 for determining the clock bias between the receiver 103 and the constellation of satellites 101, referred to as corrected clock bias $CB_{jcorr}(t'')$. This corrected clock bias is determined using the estimated bias $\delta t_{GNSS}(t'') - \delta_j(t'')$ of the clock of the receiver supplied by the estimation block 203. The determination block 204 is also designed to receive corrected clock biases $CB_{kcorr}(t'')$, $CB_{lcorr}(t'')$ coming from other drones.

Lastly, the determination device 20 comprises a block for differential measurements and for localization 205. This block 205 is designed to receive the corrected clock bias $CB_{jcorr}(t'')$ of the $j^{th}$ receiver 103j. This block 205 is also designed to receive a corrected clock bias $CB_{kcorr}(t'')$ coming from a $k^{th}$ receiver 103$_k$ and a corrected clock bias $CB_{lcorr}(t'')$ coming from an $l^{th}$ receiver 103$_l$. Using the corrected clock biases $CB_{jcorr}(t'')$, $CB_{kcorr}(t'')$, $CB_{lcorr}(t'')$, the block 205 determines the position of the decoy 102.

Another subject of the invention relates to a computer program product, also referred to as software, comprising program instructions usable by the device 20 for determining the position of the decoy 102 which, when they are executed or interpreted by the determination device 20, trigger the implementation of the method for determining the position of the decoy 102 in a vehicle or an aircraft. This software is, for example, introduced in the form of a "add-on" in the receiver or in a navigation system of the platform using the information delivered by the GNSS receiver.

The invention is not limited to the embodiments and variants described and other embodiments and variants will become clearly apparent to those skilled in the art.

Thus, the invention is also applicable when the decoy is mobile. At each measurement cycle, the position of the decoy will be determined, which will allow a genuine "tracking" of this decoy to be carried out.

Thus, it is possible to determine a decoy attack other than by a detection of a jump of the clock bias.

The invention claimed is:

1. A method for determining the position of a decoy using at least one receiver (103; 103$_1$, ... 103$j$, ... 103$_N$), the at least one receiver (103; 103$_1$, ... 103$j$, ... 103$_N$) being designed to receive signals coming from the satellites of a GNSS radionavigation system, the said receiver (103; 103$_1$, ... 103$j$, ... 103$_N$) and the said GNSS radionavigation system each having a clock, respectively referred to as clock of the at least one receiver and reference clock, the said clock of the at least one receiver and the said reference clock having a time difference at a time t referred to as reference clock bias ($CB_{ref}(t)$; $CB_{jref}(t)$), the said clock of the at least one receiver drifting over time with respect to the reference clock, the said method comprising:
 a step (E3) for detecting a decoy attack;
 a step (E5) for correcting the clock bias delivered by the at least one receiver (103, 103$_1$, ... 103$j$, ... 103$_N$) at a time t'', referred to as corrected clock bias ($CB_{corr}(t'')$; $CB_{jcorr}(t'')$), the said correction being made based on an estimated drift (D; D$_j$) of the clock of the at least one receiver;
 a step (E6) for differential measurements using at least three corrected clock biases ($CB_{corr}(t'')$, $CB_{corr}(t'')$, $CB_{corr}(t''')$; $CB_{jcorr}(t'')$, $CB_{kcorr}(t'')$, $CB_{lcorr}(t'')$) in order to determine the position of the decoy;
 wherein the corrected clock bias ($CB_{corr}(t'')$) corresponds to the equation:

$$CB_{corr}(t'') = (\delta_s(t'') - (t'')) - D(t''-t_0) - CBe(t_0),$$

wherein $\delta_s$ represents a value of the drift of the clock of the decoy as seen by the at least one receiver, $\delta$ is the actual drift of the clock of the at least one receiver, $CBe(t_0)$ is the known value of the clock bias delivered by the at least one receiver at the time $t_0$ of the start of an attack.

2. The method according to claim 1, wherein the position of the decoy is obtained using only one receiver, the said receiver being mobile, and wherein the estimated drift (D) is determined with respect to a clock of the decoy.

3. The method according to claim 1, wherein the position of the decoy is determined using several receivers ($103_1, \ldots 103j, \ldots, 103_N$) and wherein the estimated drift ($D_j$) is determined with respect to the GNSS radionavigation system.

4. The method according to claim 3, wherein the corrected clock bias ($CB_{jcorr}(t'')$) corresponds to the equation:

$$CB_{jcorr}(t'') = (\delta_s(t'') - \delta_j(t'')) - D_j(t'' - t_0) - CBe(t_0)$$

wherein $\delta_s$ represents a value of the drift of the clock of the decoy as seen by the at least one receiver, $\delta_j$ is the actual drift of the clock of the $j^{th}$ receiver ($103_j$), $CBe_j(t_0)$ is the known value of the clock bias delivered by the $j^{th}$ receiver ($103_j$) at the time $t_0$ of the start of an attack.

5. The method according to claim 3, wherein the position of the said decoy is estimated based on measurements carried out by several receivers ($103_1, \ldots 103j, \ldots 103_N$) at the same time.

6. The method according to claim 1, wherein the differential measurement step (E6) is carried out using a multilateration method, the said multilateration method being designed to process a time difference of signals.

7. The method according to claim 1, wherein the said method comprises a step (E7) for exploiting Doppler measurements in order to improve the determination of the position of the decoy.

8. The method according to claim 1, wherein the at least one receiver is mobile and the position of the decoy is estimated based on at least three measurements carried out at various times.

9. The method according to claim 1, wherein the step for detecting the decoy attack comprises:
- a step (E1) for receiving an input signal by the at least one receiver ($103; 103_1, \ldots 103j, \ldots 103_N$) at a time t', the said input signal comprising information on a clock of the emitter of the said input signal;
- a step (E2) for determining a time difference between the clock of the at least one receiver and the clock of the emitter of the said input signal at this time t', referred to as determined clock bias ($CB_{det}(t')$; $CB_{jdet}(t')$);
- if the clock bias determined at this time t' is different from the reference clock bias at the time t' ($CB_{ref}(t')$; $CB_{jref}(t')$), then the said emitter is a decoy and the time t' corresponds to the time $t_0$ of the start of an attack.

10. The method according to claim 9, wherein, as soon as it is determined that the emitter is a decoy, the receiver ($103; 103_1, \ldots 103j, \ldots 103_N$) is oriented towards another satellite radionavigation system and/or the mobility of the at least one receiver is managed by an assembly of mechanical sensors.

11. A non-transitory computer readable medium on which is stored a computer program product comprising program instructions usable by a device for determining the position of a decoy, which, when executed by a processor in said device, implements the method for determining the position of the decoy according to claim 1.

12. A device for determining the position of a decoy using at least one receiver ($103; 103_1, \ldots 103j, \ldots 103_N$), the at least one receiver ($103; 103_1, \ldots 103j, \ldots 103_N$) being designed to receive signals coming from satellites of a GNSS radionavigation system, the said receiver ($103; 103_1, \ldots 103j, \ldots 103_N$) and the said GNSS radionavigation system each having a clock, respectively referred to as clock of the at least one receiver and reference clock, the said clock of the at least one receiver and the said reference clock having a time difference at a time t referred to as reference clock bias ($CB_{ref}(t)$; $CB_{jref}(t)$), the said clock of the at least one receiver drifting over time with respect to the reference clock, the device for determination the position of the decoy comprising:
- a module for detecting a decoy attack;
- a block for correcting the clock bias delivered by the at least one receiver ($103; 103_1, \ldots 103j, \ldots 103_N$) referred to as corrected clock bias ($CB_{corr}(t'')$; $CB_{jcorr}(t'')$), the said correction being carried out based on an estimated drift ($D; D_j$) of the clock of the at least one receiver;
- a block for differential measurements using at least three corrected clock biases ($CB_{corr}(t'')$, $CB_{corr}(t''')$, $CB_{corr}(t'''')$; $CB_{jcorr}(t'')$, $CB_{kcorr}(t'')$, $CB_{lcorr}(t'')$) for determining the position of the decoy;
- wherein the corrected clock bias ($CB_{corr}(t'')$) corresponds to the equation:

$$CB_{corr}(t'') = (\delta_s(t'') - (t')) - D(t'' - t_0) - CBe(t_0),$$

wherein $\delta_s$ represents a value of the drift of the clock of the decoy as seen by the at least one receiver, $\delta$ is the actual drift of the clock of the at least one receiver, $CBe(t_0)$ is the known value of the clock bias delivered by the at least one receiver at the time $t_0$ of the start of an attack.

13. A navigation system designed to exploit the information delivered by at least one receiver ($103; 103_1, \ldots 103j, \ldots 103_N$), the said navigation system comprising a device for determining the position of a decoy according to claim 12.

14. An aircraft comprising a device for determining the position of a decoy according to claim 12.

15. The aircraft according to claim 14, wherein the said aircraft is a drone.

16. The aircraft according to claim 15, wherein the said drone is a master drone designed to communicate with a plurality of other drones referred to as slave drones.

* * * * *

UNITED STATES PATENT AND TRADEMARK OFFICE
CERTIFICATE OF CORRECTION

PATENT NO.        : 12,379,451 B2
APPLICATION NO.   : 17/565176
DATED             : August 5, 2025
INVENTOR(S)       : Dominique Heurguier et al.

Page 1 of 1

It is certified that error appears in the above-identified patent and that said Letters Patent is hereby corrected as shown below:

In the Claims

In Claim 1, Column 12, Line 57, "CBcorr(t") = ($\delta$S(t") – (t")) – D(t" – $t_0$) – CBe($t_0$)," should be
-- CBcorr(t") = ($\delta$S(t") – $\delta$(t")) – D(t" – $t_0$) – CBe($t_0$), --.

In Claim 12, Column 14, Line 33, "CBcorr(t") = ($\delta$S(t") – (t")) – D(t" – $t_0$) – CBe($t_0$)," should be
-- CBcorr(t") = ($\delta$S(t") – $\delta$(t")) – D(t" – $t_0$) – CBe($t_0$), --.

Signed and Sealed this
Twenty-third Day of September, 2025

John A. Squires
*Director of the United States Patent and Trademark Office*